June 13, 1961  J. P. FOLEY  2,988,163
TREE TRIMMING DEVICE
Filed Dec. 3, 1958  2 Sheets-Sheet 1

INVENTOR.
JOHN P. FOLEY

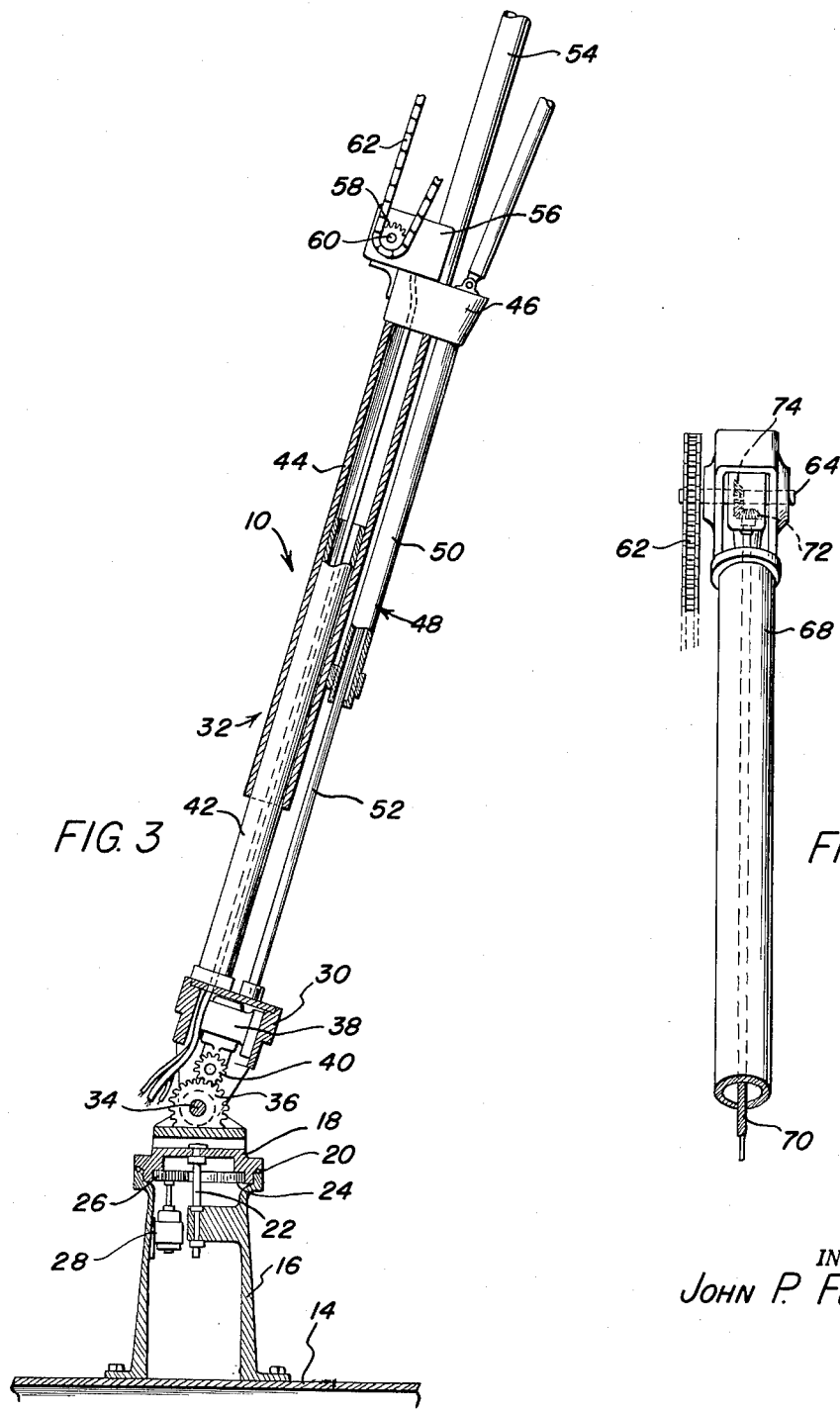

United States Patent Office 2,988,163
Patented June 13, 1961

2,988,163
TREE TRIMMING DEVICE
John P. Foley, 1326 Michigan Ave., Joplin, Mo.
Filed Dec. 3, 1958, Ser. No. 778,020
3 Claims. (Cl. 182—2)

The present invention generally relates to a tree trimming and limb removing device and more particularly to such a device mounted on a truck or similar vehicle.

The primary object of the present invention is to provide a tree trimmer mounted on a truck chassis and incorporating an adjustable boom carrying a platform for supporting various machinery, such as a tree trimming saw and operators therefor, together with control means on the platform for controlling the position of the platform from the platform itself.

A further object of the present invention is to provide a boom which is extensible, rotatable about a vertical axis, articulated and angularly adjustable.

Another object of the invention is to provide a boom with a platform with a power drive means extending from the boom to the platform thereby utilizing external power to operate the machinery.

Still a further object of the present invention is to provide a tree trimmer in accordance with the preceding objects which is simple in construction, efficient in operation, safe, utilitarian, easy to control and relatively inexpensive to manufacture.

Still other objects and advantages will appear from the following description of an exemplifying embodiment of this invention, from the appended claims, and from the accompanying drawings:

FIGURE 3 is longitudinal sectional view of the lower portion of the boom with portions shown in elevation for clarity; and FIGURE 4 is a partial plan view of the jib boom and power shaft therein for driving the machinery.

Figure 2:
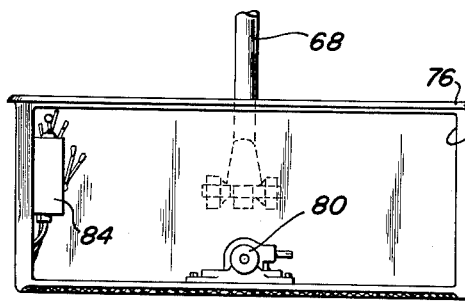
FIGURE 2 is a front view of the platform or carriage for the machinery and operators.
Figure 1:
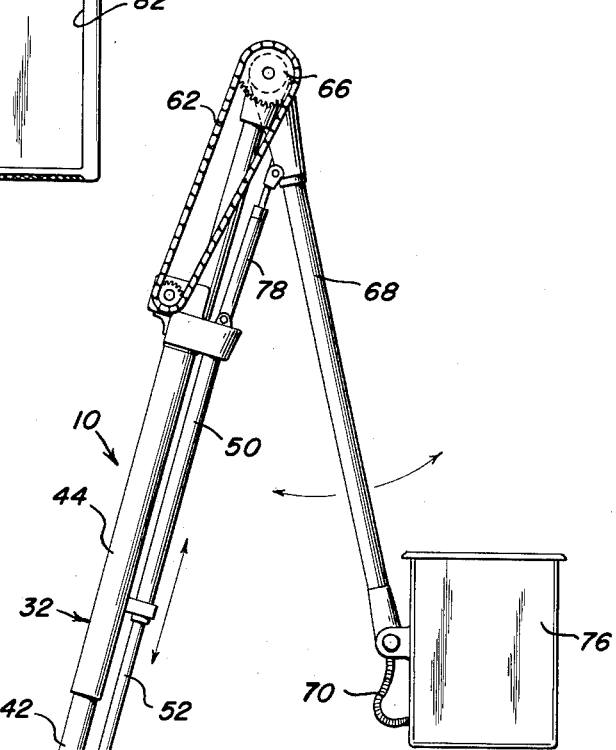
FIGURE 1 is a side elevation of the tree trimmer of the present invention.
Figure 1:
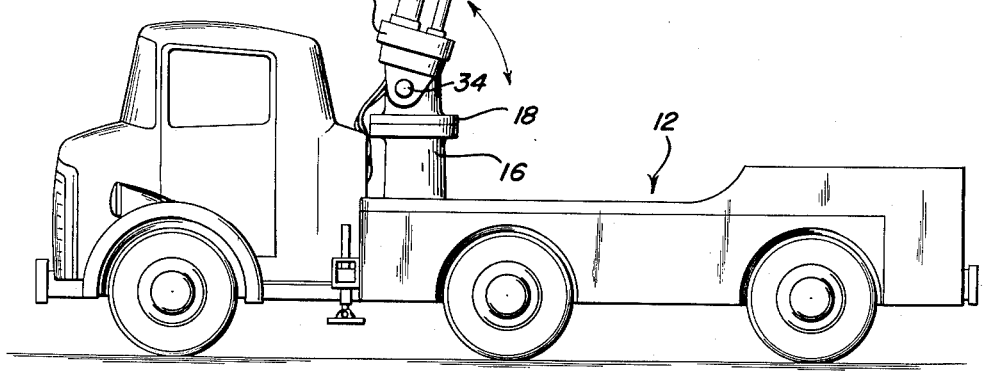

Referring now specifically to the drawings, the numeral 10 generally designates the tree trimmer of the present invention which is mounted on a mobile, self-propelled truck chassis 12 of conventional construction and including a supporting base plate 14 which supports an upstanding hollow housing 16 thereon.

The housing 16 is provided with a rotatable support plate 18 on the upper end thereof with the plate 18 being supported by bearings 20 and held in position by vertical shaft 22 which is connected to the housing 16 and permits rotation of plate 18 about a vertical axis. The plate 18 has an internal gear 24 formed thereon and a drive pinion 26 is in meshing engagement therewith. The pinion 26 is driven by an electric or hydraulic motor 28 located in housing 16. The upper portion of plate 18 is pivotally attached to a lower housing 30 of an elongated boom generally designated by numeral 32. A horizontal pivot shaft 34 interconnects housing 30 and plate for swinging movement of the boom 32 in a vertical plane defined by the shaft 34. The plate 18 is provided with a rigid vertically disposed gear 36 having a center coincidental with the shaft 34. The housing 30 is provided with a motor 38 driving a pinion 40 in meshing engagement with the gear 36 whereby operation of the motor 38 will pivot the boom about pivot shaft 34.

The boom 32 includes a lower cylindrical member 42 rigid with housing 30 and which is telescopically received in an upper cylindrical member 44 rigid with an upper connector plate 46. Also extending between housing 30 and plate 46 is an elongated hydraulically operated piston and cylinder arrangement 48 including cylinder 50 and piston rod 52.

Extending longitudinally from the plate 46 is a rigid tubular member 54 generally forming an extension of the boom 32. Also mounted on the plate 48 is a motor 56 having a sprocket gear 58 connected to the output shaft 60. A drive chain 62 encircles the gear 58 and is driven thereby. The upper end of the tubular member is provided with a transverse shaft 64 having a sprocket gear 66 rigid therewith. The sprocket gear 66 and shaft 64 are driven by the motor 54 through the chain 62.

An elongated arm or jib boom 68 is mounted on shaft 64 for swinging movement in a vertical plane about the axis of the shaft 64. The arm 68 is hollow and provided with a drive shaft 70 therein which may be flexible if desired. The drive shaft 70 is provided with a bevel gear 72 on the inner end thereof in meshing engagement with bevel gear 74 on the shaft 70.

Pivotally supported on the outer end of the boom or arm 68 is a receptacle like carriage or platform 76 which is supported for arcuate movement in a vertical plane with carriage always remaining in a vertical position. Vertical swinging movement of the arm 68 is caused by a hydraulic piston and cylinder arrangement 78 interconnecting plate 46 and the arm 68 in spaced relation to the shaft 64.

The carriage 76 is provided with a power takeoff assembly 80 on the floor thereof for attaching various equipment. The front wall of the carriage 76 is open as indicated by numeral 82. Also, the carriage 76 is provided with a control assembly 84 which is connected to the various motors and piston and cylinder arrangements whereby the operators may accurately position themselves and the equipment and accurately control the equipment for efficient operation thereof.

The various motors may be either electric or hydraulic and each is provided with a suitable power source and control device located in the control assembly 84. Various equipment such as power endless chain saws, ditch diggers, sprayers, and any equipment that may need to be elevated may be mounted on the carriage or platform.

It is understood that this invention is not confined to the particular embodiment shown and described, the same being merely illustrative and that this invention may be carried out in other ways within the scope of the appended claims without departing from the spirit of this invention, as it is obvious that the particular embodiment shown and described is only one of the many that may be employed to attain the objects of this invention.

I claim:

1. A tree trimming device comprising a mobile frame, an elongated main boom mounted on said frame, means connecting the boom to the frame for adjustable rotation about a vertical axis and about a horizontal axis, a jib boom mounted on the outer end of the main boom for pivotal movement about a transverse axis perpendicular to the longitudinal axis of the main boom, a carriage mounted on the outer end of said jib boom and means interconnecting the jib boom and main boom for swinging the jib boom in a vertical plane, said main boom being longitudinally adjustable for varying the height thereof; said carriage including vertical sidewalls and an open top whereby operators may stand in the carriage, a power takeoff assembly on said carriage for driving equipment, one of said sidewalls having an enlarged open area for permitting use of the equipment by the operator.

2. A tree trimming device comprising a mobile frame, an elongated main boom mounted on said frame, means connecting the boom to the frame for adjustable rotation about a vertical axis and about a horizontal axis, a jib boom mounted on the outer end of the main boom for pivotal movement about a transverse axis perpendicular to the longitudinal axis of the main boom, a carriage mounted on the outer end of said jib boom, and means interconnecting the jib boom and main boom for swinging the jib boom in a vertical plane, said main boom being longitudinally adjustable for varying the height thereof; a motor mounted on said main boom, a longitudinal drive shaft mounted on said jib boom and having one end drivingly connected to the motor and the other end drivingly connected to a power takeoff assembly on the carriage.

3. A tree trimming device comprising a mobile frame, an elongated main boom mounted on said frame, means connecting the boom to the frame for adjustable rotation about a vertical axis and about a horizontal axis, a jib boom mounted on the outer end of the main boom for pivotal movement about a transverse axis perpendicular to the longitudinal axis of the main boom, a carriage mounted on the outer end of said jib boom, and means interconnecting the jib boom and main boom for swinging the jib boom in a vertical plane, said main boom being longitudinally adjustable for varying the height thereof; a motor mounted on said main boom, a longitudinal drive shaft mounted on said jib boom and having one end drivingly connected to the motor and the other end drivingly connected to a power takeoff assembly on the carriage; said carriage including a control assembly for controlling operation of a power takeoff assembly and for orientating the carriage vertically and horizontally thereby enabling use of equipment carried by said carriage.

References Cited in the file of this patent

UNITED STATES PATENTS

| | | |
|---|---|---|
| 2,567,127 | Shoffner | Sept. 4, 1951 |
| 2,616,768 | Stemm | Nov. 4, 1952 |
| 2,666,417 | Harsch | Jan. 19, 1954 |
| 2,724,620 | Johnson et al. | Nov. 22, 1955 |